United States Patent
Moribe et al.

(10) Patent No.: US 7,859,779 B2
(45) Date of Patent: Dec. 28, 2010

(54) MAGNETIC DISK APPARATUS AND MAGNETIC DISK ACCESS CONTROLLING METHOD

(75) Inventors: Mineo Moribe, Kawasaki (JP); Masakazu Taguchi, Kawasaki (JP); Kazuyuki Ozaki, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 14 days.

(21) Appl. No.: 12/479,397

(22) Filed: Jun. 5, 2009

(65) Prior Publication Data

US 2010/0020436 A1  Jan. 28, 2010

(30) Foreign Application Priority Data

Jul. 23, 2008  (JP)  ............... 2008-189536

(51) Int. Cl.
G11B 5/09 (2006.01)
G11B 5/596 (2006.01)
(52) U.S. Cl. ...................... 360/39; 360/77.08
(58) Field of Classification Search ............... None
See application file for complete search history.

(56) References Cited

U.S. PATENT DOCUMENTS 7,630,156 B2 * 12/2009 Okawa et al. ............ 360/48

FOREIGN PATENT DOCUMENTS

| JP | A 63-149884 | 6/1988 |
| JP | A 2003-157507 | 5/2003 |
| JP | A 2004-110896 | 4/2004 |
| JP | A 2006-31859 | 2/2006 |
| JP | A 2007-226918 | 9/2007 |

* cited by examiner

Primary Examiner—K. Wong
(74) Attorney, Agent, or Firm—Greer, Burns & Crain, Ltd.

(57) ABSTRACT

A magnetic disk apparatus includes a magnetic disk, a magnetic head, a servo reproduction signal generator and a magnetic head controller. The disk includes a data recording area and a servo-pattern area. The data recording area includes a non-magnetic area scattered with magnetic regions, and the servo-pattern area includes uniformly magnetized magnetic regions larger than the magnetic regions in the recording area. The magnetic head reciprocates radially of the disk, giving a magnetization direction to the magnetic regions in the data recording area and reading the magnetization direction of the magnetic regions in the data recording area and the servo-pattern area. The servo reproduction signal generator reads the servo-pattern area, using the magnetic head, via an absolute-value calculation circuit to generate a servo reproduction signal before the recording or reading with respect to the data recording area. The magnetic head controller performs recording or reproducing with respect to the data recording area by controlling the magnetic head based on the servo reproduction signal.

3 Claims, 6 Drawing Sheets

MAGNETIC DISK APPARATUS AND MAGNETIC DISK ACCESS CONTROLLING METHOD

CROSS-REFERENCE TO RELATED APPLICATION

This application is based upon and claims the benefit of priority of the prior Japanese Patent Application No. 2008-189536, filed on Jul. 23, 2008, the entire contents of which are incorporated herein by reference.

FIELD

An embodiment of the present invention relates to a magnetic disk apparatus suitable for perpendicular magnetic recording. Another embodiment of the present invention relates to a magnetic disk access control method.

BACKGROUND

Currently, proposals are made for perpendicular magnetic recording as an alternative to horizontal magnetic recording. In horizontal magnetic recording, recording dots have a magnetization direction along the recording plane in the magnetic recording layer. Perpendicular magnetic recording has an advantage over the horizontal magnetic recording in that recording density can be increased easily. In perpendicular magnetic recording, recording dots have a magnetization direction in the thickness direction in the magnetic recording layer. A magnetic disk apparatus suitable for perpendicular magnetic recording is described in e.g. Japanese Laid-open Patent Publication No. 2003-157507, in which the magnetic disk apparatus includes a bit patterned medium as a recording medium. In the bit patterned medium, magnetic regions each representing a recording dot are spaced from each other equidistantly.

Bit patterned media have a data recording area which is a non-magnetic area scattered with magnetic regions, and a servo-pattern area which is used for disk access control such as magnetic head positioning control and clock signal generation. The servo-pattern area is formed with a large number of belt-like magnetic regions extending substantially radially of the magnetic disk. In the data recording area each magnetic region is given a magnetization direction as a representation of a datum to be recorded whereas in the servo-pattern area all of the magnetic regions are given the same magnetization direction in a formatting procedure which is performed, generally, during the manufacturing process.

However, the magnetic disk apparatus equipped with the above-described conventional bit patterned medium has a problem in regards to disk access control, i.e., a problem that magnetic regions having a large area are susceptible to magnetization reversal caused by external disturbances.

Figure 6A:
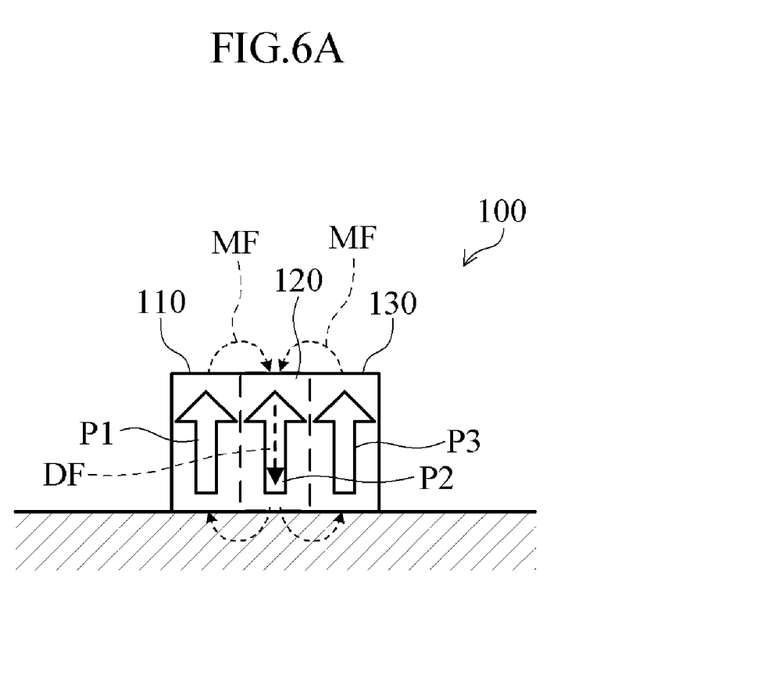
FIGS. 6A and 6B are diagrams for illustrating a conventional magnetic disk apparatus.

As illustrated in FIG. 6A, a magnetic region 100 is composed of polycrystalline crystal grains and includes a plurality of magnetic domains 110-130, each of which is bordered by a crystal grain boundary and functions as a unit for generation of magnetization directions P1-P3. The magnetic domains 110-130 included in the magnetic region 100 have a strong magnetic exchange coupling force, and therefore the magnetic region 100 is magnetized in one direction.

Figure 6B:
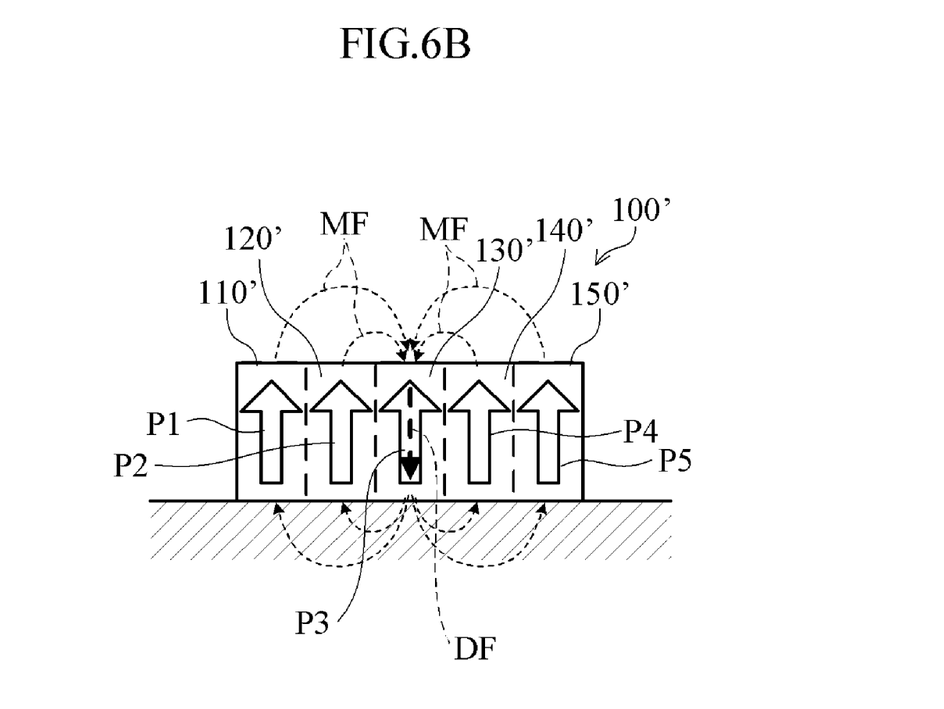

FIG. 6B depicts a magnetic region 100' which is larger than the region illustrated in FIG. 6A and therefore includes a larger number of magnetized magnetic domains 110'-150'. Take, for example, the middle magnetic domain 130'. This domain is influenced by a magnetic field MF which is generated by the sandwiching magnetic domains 110', 120', 140' and 150'. The greater is the area of the magnetic region 100', the greater is the influence from the magnetic field MF from both sides, leading to generation of a large demagnetizing field DF in each of the magnetic domains 110'-150'. This seems to suggest that the magnetic region 100' has a smaller coercive force as its area becomes larger, and therefore the magnetization directions P1-P5 in a large magnetic region 100' can be reversed easily by external magnetic disturbances.

This affects the disk access control servo-pattern area which contains a large number of magnetic regions which have a larger area than magnetic regions in the data recording area. When the disk is new, the magnetic regions have a perfectly uniform magnetization direction, but the magnetization direction is likely to be reversed by external disturbances and other forces in the magnetic regions. Once the reversing of magnetization direction occurs in the servo-pattern area, it becomes no longer possible to make correct magnetic recognition of the magnetic regions in the servo-pattern area, leading to troubles in magnetic head positioning control and clock signal generation, and to inability to perform the disk access control properly.

SUMMARY

The present invention has been proposed under the above-described circumstances, and it is therefore an object of the present invention to provide a magnetic disk apparatus which is capable of making magnetic recognition of the servo-pattern area correctly and performing disk access control properly. Another object is to provide a magnetic disk access control method.

According to a first aspect of the present invention, there is provided a magnetic disk apparatus including a magnetic disk, a magnetic head, a servo reproduction signal generator and a magnetic head controller. The magnetic disk is provided with a data recording area and a servo-pattern area, where the data recording area is provided by a non-magnetic area scattered with magnetic regions, and the servo-pattern area includes a plurality of magnetic regions each having a larger area than the magnetic regions in the data recording area and magnetized in a predetermined uniform magnetization direction. The magnetic head is arranged to reciprocate radially of the magnetic disk for giving a magnetization direction to the magnetic regions in the data recording area and for reading a magnetization direction of the magnetic regions in the data recording area and of the magnetic regions in the servo-pattern area. The servo reproduction signal generator is provided for reading the servo-pattern area with the magnetic head via an absolute-value calculation circuit so as to generate a servo reproduction signal prior to recording to or reading from the data recording area. The magnetic head controller is provided for performing recording to or reproducing from the data recording area by controlling the magnetic head based on the servo reproduction signal.

According to a second aspect of the present invention, there is provided a magnetic disk access control method for a magnetic disk apparatus that includes: a magnetic disk provided with a data recording area and a servo-pattern area, where the data recording area is provided by a non-magnetic area scattered with magnetic regions, and the servo-pattern area includes a plurality of magnetic regions each having a larger area than the magnetic regions in the data recording area and magnetized in a predetermined uniform magnetization direction; and a magnetic head arranged to reciprocate radially of the magnetic disk for giving a magnetization direction to the magnetic regions in the data recording area and for reading a magnetization direction of the magnetic regions in the data recording area and of the magnetic regions in the servo-pattern area. In the method, the servo-pattern area is read with use of the magnetic head prior to the recording to or the reading from the data recording area. In accordance with the method, a servo reproduction signal generation procedure is performed for reading the servo-pattern area with the use of the magnetic head, and for generating a servo reproduction signal through the reading of the servo-pattern area via the absolute-value calculation circuit. Also, a magnetic head controlling procedure is performed for controlling the magnetic head based on the servo reproduction signal thereby performing recording to or reproducing from the data recording area.

With the technique described above, even if the servo-pattern area includes magnetic regions where the magnetization direction is reversed, it is possible, through the absolute-value calculation circuit, to produce a servo reproduction signal carrying the same components as those obtained from the magnetic regions having the same, proper magnetization directions. Hence, it is possible to recognize the servo-pattern area properly, and therefore to perform disk access control properly.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
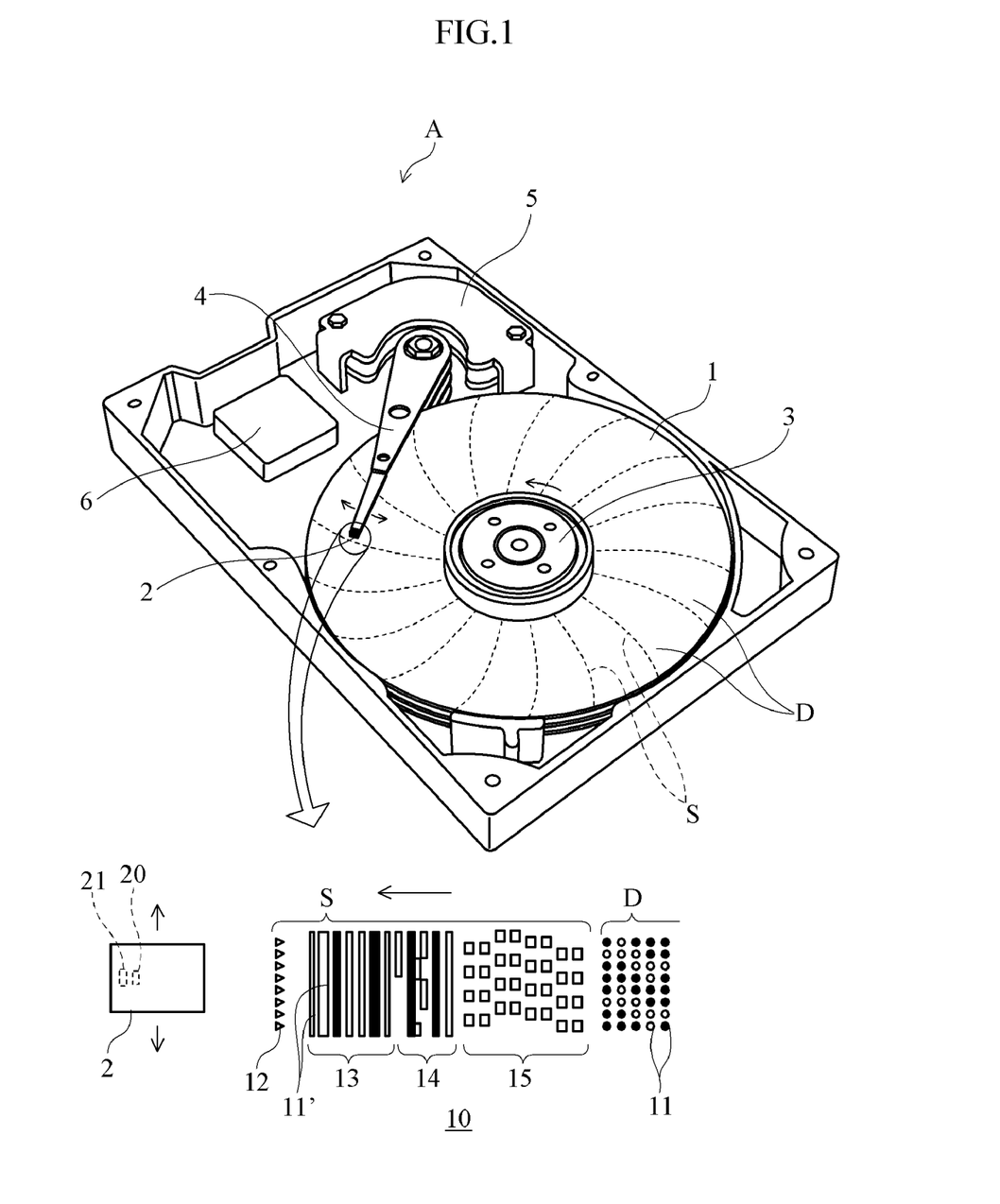
FIG. 1 is an overall perspective view which depicts a magnetic disk apparatus according to an embodiment of the present invention.

FIGS. 1-4 depict a magnetic disk apparatus as an embodiment of the present invention. As illustrated in FIG. 1, a magnetic disk apparatus A includes magnetic disks 1, magnetic heads 2, a spindle motor 3, a swing arm 4, a voice coil motor 5, and a disk controller 6. The magnetic disks 1 are provided by a bit patterned medium and each disk has an upper and a lower surfaces both serving as a recording surface. The disks are stacked, with a predetermined space provided below and above each disk. The magnetic heads 2, which make reading/writing of magnetic information from/to the magnetic disk 1, are faced to respective recording surfaces of the magnetic disk 1 at respective tips of the swing arm 4. Each magnetic head 2 is provided with a reproducing element 20 and a recording element 21 placed next to each other substantially in a circumferential direction of the magnetic disk 1 respectively for reading and writing of magnetic information performed independently from each other (see FIG. 2). The spindle motor 3 turns the magnetic disk 1 at a high speed. The swing arm 4, which is swung by the voice coil motor 5, moves the magnetic heads 2 in a reciprocating path in a substantially radial direction of the magnetic disk 1. The magnetic heads 2, the spindle motor 3, and the voice coil motor 5 are controlled by the disk controller 6. The disk controller 6 is provided by a microcomputer which includes a CPU, a memory, etc., or by a wired logic circuit which is an equivalent to the microcomputer.

Figure 3:
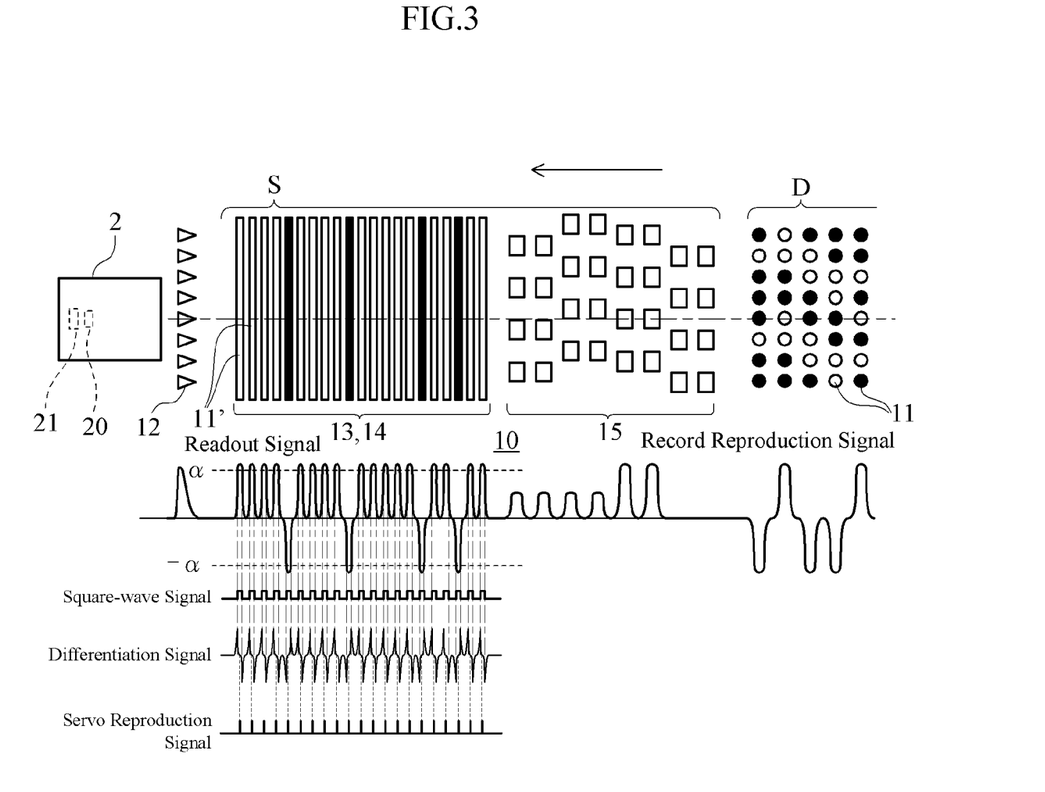
FIG. 3 is a diagram for illustrating signal processing.

As illustrated in FIG. 1 and FIG. 3, the magnetic disk 1 is provided with a plurality of servo-pattern areas S so as to divide a data recording area D along the path of the magnetic head 2. The data recording area D, which is an area where recording/reproducing of magnetic information is performed, is a non-magnetic area 10 dotted with magnetic regions 11 arranged equidistantly in a circumferential direction of the magnetic disk 1. Magnetic information is recorded/reproduced in the form of magnetization direction at each of the magnetic regions 11, i.e., whether the magnetization is made in an upward direction or in a downward direction along the thickness of the magnetic disk 1.

As illustrated in FIG. 1, the servo-pattern area S has a reading start mark 12, a preamble section 13, an address section 14, and a burst pattern section 15. The reading start mark 12 is provided by triangular magnetic regions for example, or magnetic regions of a shape which cannot be found elsewhere, arranged in line substantially radially of the magnetic disk 1 at a head of the servo-pattern area S. The preamble section 13, which is provided for generation of clock signals utilized as a reference when the magnetic head 2 performs recording/reproducing to/from the address section 14, the burst pattern section 15 and the data recording area D, is a non-magnetic area 10 formed with a plurality of long and narrow magnetic regions 11' each having a larger area than the magnetic region 11 in the data recording area D and extending substantially radially of the magnetic disk 1. The address section 14, which provides address information such as a track number and a sector number, is a non-magnetic area 10 including magnetic regions 11' patterned to the address information. The burst pattern section 15 provides a pattern for fine tuning in tracking, and includes rectangular magnetic regions arranged in a predetermined layout pattern. It should be noted here that in the present embodiment, marking is made in magnetic regions 11' of the preamble section 13 and of the address section 14, and these magnetic regions 11' are extended substantially radially of the magnetic disk 1 to have a large area. However, magnetic regions in the burst pattern section may also be extended substantially radially of the magnetic disk to have a large area depending on the tracking method employed.

The servo-pattern area S described above is magnetized in the manufacturing process so that the magnetization direction is the same predetermined direction in all of the magnetic regions 11'. As described above, the servo-pattern area S includes a large number of magnetic regions 11' which have a larger area than that of the magnetic regions 11 in the data recording area. For this reason, the magnetic regions 11' in the servo-pattern area S is more susceptible than magnetic regions 11 in the data recording area D to magnetization direction reversal caused by external disturbances. In other words, as illustrated in FIG. 1 and FIG. 3, the servo-pattern area S originally has all of its magnetic regions 11' magnetized in the same direction in the manufacturing process as indicated by white magnetic region 11', but eventually will have magnetic regions 11' magnetized in the reverse direction as indicated by black magnetic regions 11' due to external magnetic disturbances. It should be noted here that in FIG. 3, the preamble section 13 and the address section 14 are conveniently illustrated as one consistent pattern.

Figure 2:
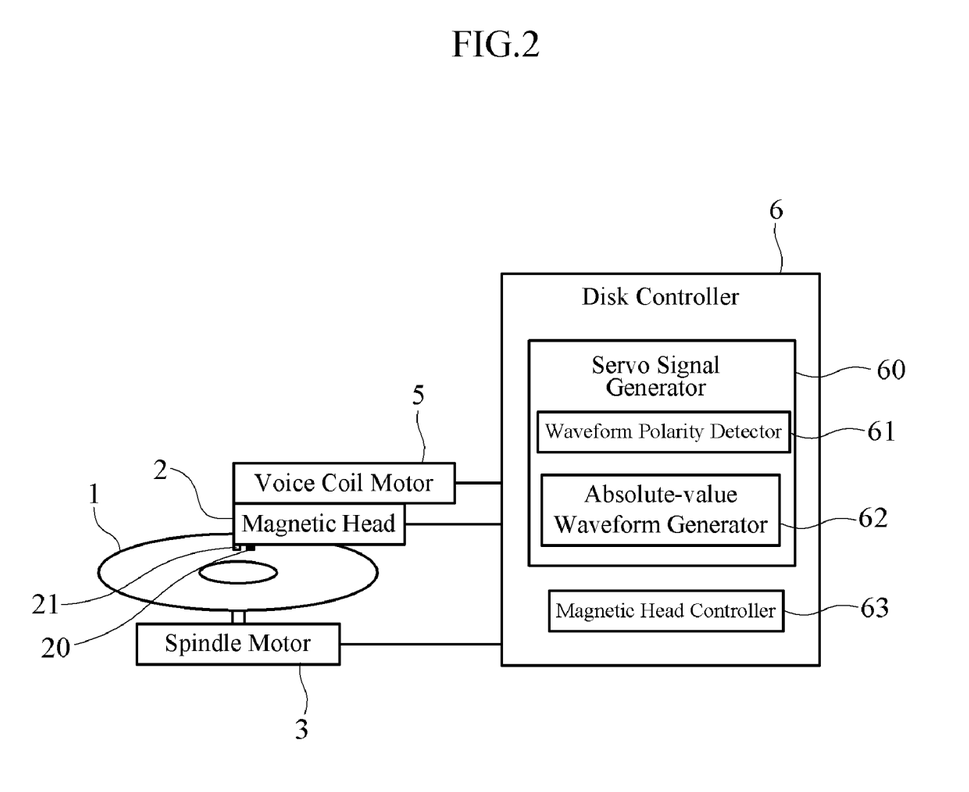
FIG. 2 is a block diagram of the magnetic disk apparatus in FIG. 1.

As illustrated in FIG. 2, the disk controller 6 includes such function modules as a servo reproduction signal generator 60 which includes the absolute-value calculation circuit, and a magnetic head controller 63, in addition to other function modules (not illustrated) which control the spindle motor 3 and the voice coil motor 5.

As the magnetic head 2 reads the servo-pattern area S via the reproducing element 20 and the information is fed to the absolute-value calculation circuit, the servo reproduction signal generator 60 generates a servo reproduction signal which is a pulse signal, as illustrated in FIG. 3, generated in response to the magnetization direction of the magnetic region 11' in the servo-pattern area S.

The absolute-value calculation circuit has the following configuration for example: A signal read from the servo-pattern area S is given to a waveform polarity detector 61, which detects a normal magnetization indicator waveform that indicates the original direction of magnetization, and a reversed magnetization indicator waveform that indicates the reverse direction of magnetization, as a component of the signal read from the servo-pattern area S. As illustrated in FIG. 3, the normal magnetization indicator waveform has a positive signal level not smaller than a threshold value α whereas the reversed magnetization indicator waveform has a negative signal level not greater than a threshold value −α. The normal magnetization indicator waveform represents a white magnetic region 11' which has the original magnetization direction while the reversed magnetization indicator waveform represents a black magnetic region 11' which has the reversed magnetization direction.

An absolute-value waveform generator 62 generates an absolute-value reproduction signal in synchronization with detection timing of the normal magnetization indicator waveform and the reversed magnetization indicator waveform.

The magnetic head controller 63 controls operation of the reproducing element 20 and recording element 21 in the magnetic head 2 based on the servo reproduction signal. For example, take a case as in FIG. 3 where reading is made to a data recording area D by the reproducing element 20. The magnetic head controller 63 controls the movement of recording element 21 based on the servo reproduction signal which is generated in the reading, so as to reproduce address information and servo burst information for accurate recording/reproducing of magnetization directions as illustrated in FIG. 3 to/from magnetic regions 11 in the data recording area D.

Figure 4:
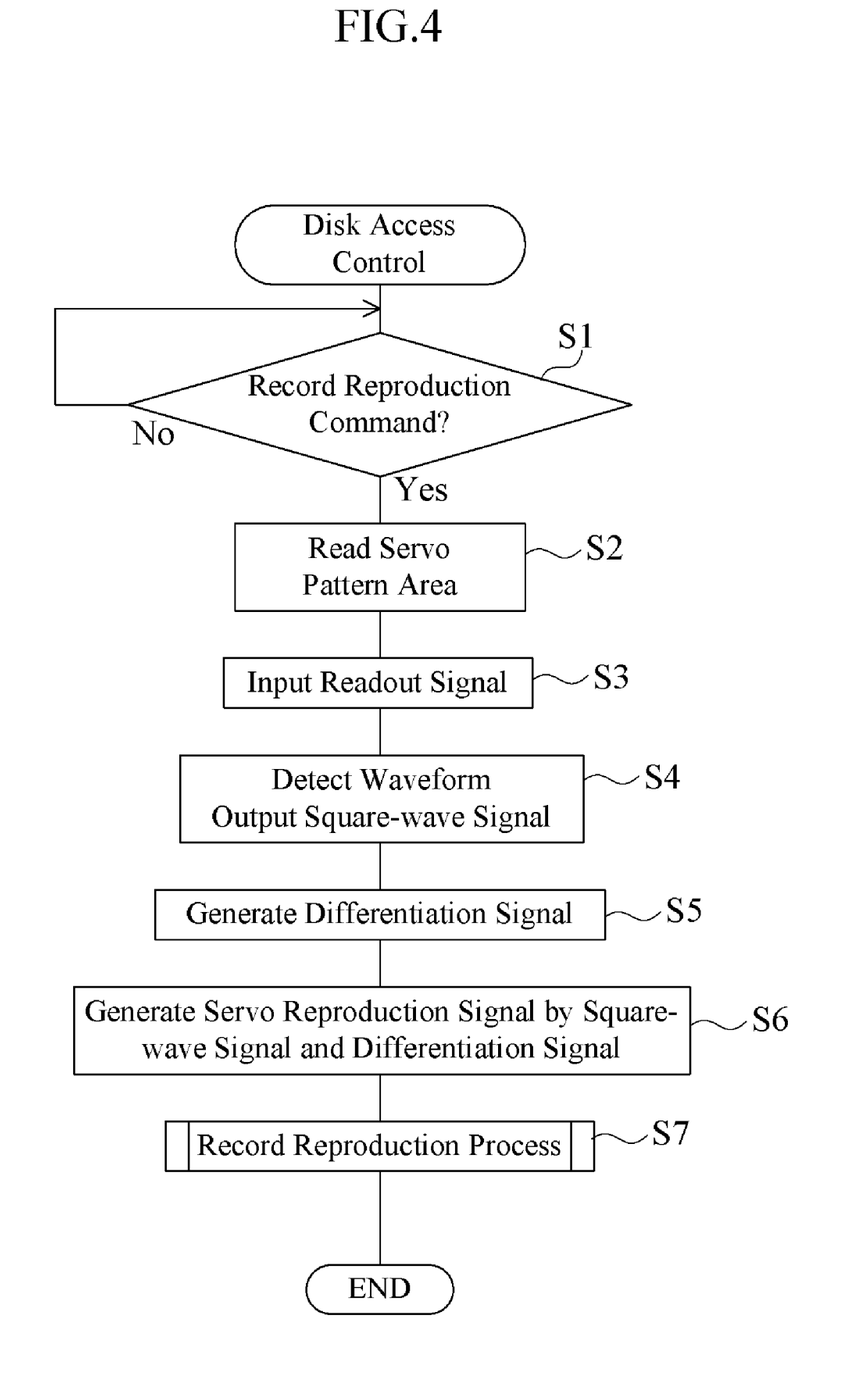
FIG. 4 is a flowchart for illustrating a disk access control procedure.

Next, an operation of the magnetic disk apparatus A will be described with reference to FIG. 4. FIG. 4 is a flowchart which depicts a disk access control procedure.

First, when a recording/reproducing command is issued from e.g. a host computer to the magnetic disk apparatus A (S1: YES), the servo reproduction signal generator 60 reads the servo-pattern area S via the reproducing element 20 of the magnetic head 2 (S2). The reading of the servo-pattern area S is triggered by a detection signal of the reading start mark 12. As a result, a readout signal as illustrated in FIG. 3 is entered (S3).

The readout signal of the servo-pattern area S is then passed through the absolute-value calculation circuit, whereby a reversed signal portion is corrected and a servo reproduction signal is generated. For example, the waveform polarity detector 61 detects a normal magnetization indicator waveform and a reversed magnetization indicator waveform contained in the readout signal, then distinguishes these waveforms by using the threshold values of ±α, and then outputs a square-wave signal (S4). The normal magnetization indicator waveform has a positive signal level, and is generated for each magnetic region 11' which has a magnetization direction identical with the original magnetization direction given at the time of manufacture. The reversed magnetization indicator waveform has a negative signal level, and is generated for each magnetic region 11' which has a magnetization direction opposite to the original magnetization direction given at the time of manufacture.

In addition to the outputting of the square-wave signal, the absolute-value waveform generator 62 differentiates the readout signal, thereby generating a differentiation signal (S5).

Thereafter, the absolute-value waveform generator 62 generates a servo reproduction signal based on the square-wave signal and the differentiation signal (S6). The signal processing from S2 through S6 as described is performed while the magnetic head 2 moves from the servo-pattern area S to the data recording area D.

As the magnetic head 2 thus enters the data recording area D, the disk controller 6 controls the magnetic head 2 based on the servo reproduction signal, and performs a recording/reproducing procedure to the data recording area D (S7). In the case of recording for example, magnetization is performed to magnetic regions 11 in the data recording area D at timing appropriate to their spacing to record intended information in the form of magnetization directions. Also, in the case of reproducing, reading is performed to the magnetic regions 11 in the data recording area D at timing appropriate to their spacing to read magnetization directions as a representation of the reproduced information.

If the step S1 does not find a recording/reproducing command to the magnetic disk apparatus A (S1: NO), the magnetic head controller 62 waits until a recording/reproducing command is issued.

Therefore, according to the magnetic disk apparatus A offered by the present embodiment, it is possible, even if the magnetization direction in magnetic regions 11' of the servo-pattern area S is reversed, to read the magnetization direction in those magnetic regions 11' through the absolute-value calculation circuit and thereby to obtain normal servo reproduction signal. This makes it possible to control the magnetic head 2 based on the servo reproduction signal and therefore, it is possible to read the servo-pattern area S properly and to perform recording/reproducing properly and smoothly thorough a disk access control based on such a servo reproduction signal.

Figure 5:
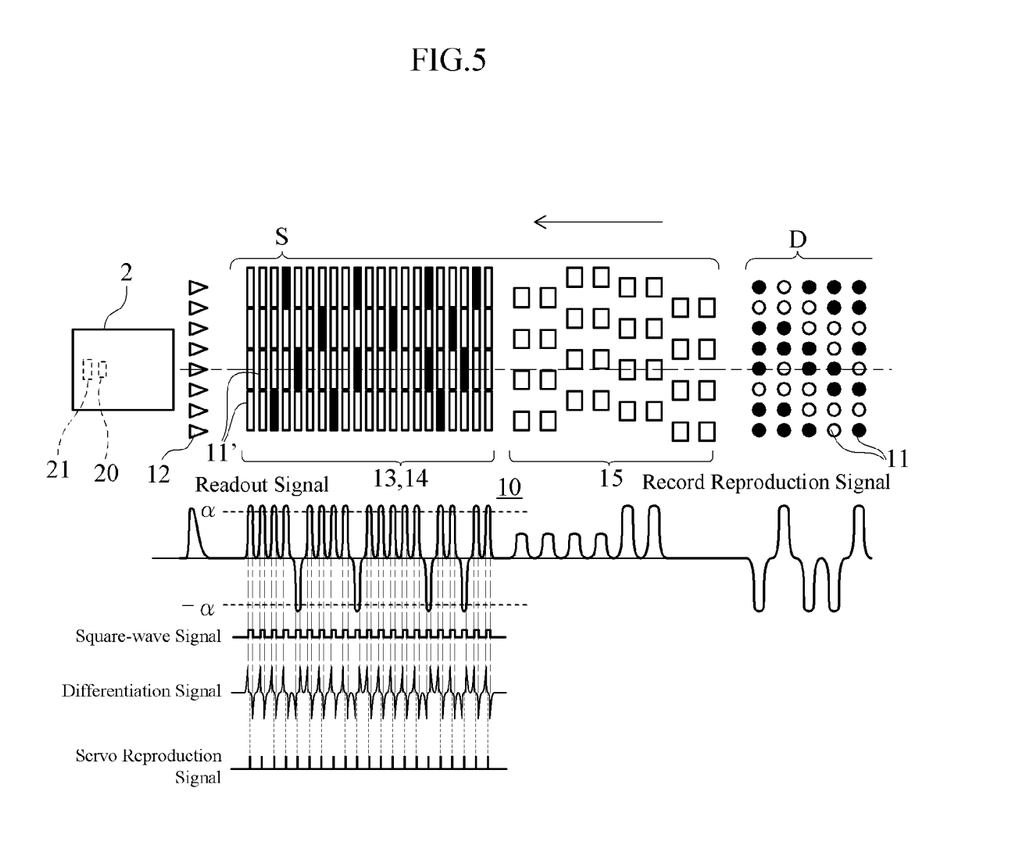
FIG. 5 is a diagram for illustrating signal processing according to another embodiment of the present invention.

FIG. 5 depicts a magnetic disk apparatus as another embodiment of the present invention. In this embodiment of the magnetic disk, the preamble section 13 and the address section 14 in the servo-pattern area S are provided by a plurality of magnetic regions 11' divided radially of the magnetic disk. Magnetic regions 11' of such a type as described above are also larger than magnetic regions 11 in the data recording area D and therefore, their magnetization direction tends to be reversed easily. Such a servo-pattern area S can also benefit from the procedure utilized in the previous embodiment, i.e., it is possible to obtain a servo reproduction signal and to control the magnetic head 2 based on the servo reproduction signal. Therefore, it is possible to read the servo-pattern area S properly and to perform recording/reproducing properly and smoothly thorough a disk access control based on the servo reproduction signal.

What is claimed is:

1. A magnetic disk apparatus comprising:
   a magnetic disk provided with a data recording area and a servo-pattern area, the data recording area being provided by a non-magnetic area scattered with magnetic regions, the servo-pattern area including a plurality of magnetic regions each having a larger area than the magnetic regions in the data recording area and magnetized in a uniform magnetization direction;

a magnetic head arranged to reciprocate radially of the magnetic disk for giving a magnetization direction to the magnetic regions in the data recording area and for reading a magnetization direction of the magnetic regions in the data recording area and of the magnetic regions in the servo-pattern area;

a servo reproduction signal generator for reading the servo-pattern area with the magnetic head via an absolute-value calculation circuit so as to generate a servo reproduction signal prior to recording to or reading from the data recording area; and a magnetic head controller for performing recording to or reproducing from the data recording area by controlling the magnetic head based on the servo reproduction signal.

2. The magnetic disk apparatus according to claim 1, wherein the absolute-value calculation circuit converts a normal magnetization indicator waveform and a reversed magnetization indicator waveform in a readout signal from the servo-pattern area into a square-wave signal based on a threshold value, outputs the converted signal, and generates the servo reproduction signal based on a signal obtained by differentiation of the readout signal from the servo-pattern area and on the square-wave signal.

3. A magnetic disk access control method for a magnetic disk apparatus including: a magnetic disk having a data recording area and a servo-pattern area, the data recording area being provided by a non-magnetic area scattered with magnetic regions, the servo-pattern area containing a plurality of magnetic regions each having a larger area than the magnetic regions in the data recording area and magnetized in a uniform magnetization direction; and a magnetic head arranged to reciprocate radially of the magnetic disk for giving a magnetization direction to the magnetic regions in the data recording area and for reading a magnetization direction of the magnetic regions in the data recording area and of the magnetic regions in the servo-pattern area; the method being for reading the servo-pattern area with the magnetic head prior to recording to or reading from the data recording area, the method comprising execution of:

a servo reproduction signal generation procedure of reading the servo-pattern area with the magnetic head, and generating a servo reproduction signal through the reading of the servo-pattern area via the absolute-value calculation circuit; and a magnetic head controlling procedure of controlling the magnetic head based on the servo reproduction signal thereby performing recording to or reproducing from the data recording area.

* * * * *